US010562387B2

(12) United States Patent
Samila et al.

(10) Patent No.: US 10,562,387 B2
(45) Date of Patent: Feb. 18, 2020

(54) COIL MODULE ASSEMBLY WITH THERMALLY DECOUPLED SOLENOID AND CIRCUIT (71) Applicant: Magna Powertrain Inc., Concord (CA)

(72) Inventors: Myron Samila, Toronto (CA); Tak-Man (Dennis) Loui, Richmond Hill (CA)

(73) Assignee: MAGNA POWERTRAIN INC., Concord (CA)

( * ) Notice: Subject to any disclaimer, the term of this patent is extended or adjusted under 35 U.S.C. 154(b) by 309 days.

(21) Appl. No.: 15/653,681

(22) Filed: Jul. 19, 2017

(65) Prior Publication Data

US 2018/0022201 A1 Jan. 25, 2018

Related U.S. Application Data (60) Provisional application No. 62/366,330, filed on Jul. 25, 2016.

(51) Int. Cl.
*B60K 6/383* (2007.10)
*F16H 63/30* (2006.01)
(Continued)

(52) U.S. Cl.
CPC .............. *B60K 6/383* (2013.01); *B60K 6/445* (2013.01); *F16D 41/16* (2013.01); *F16D 43/25* (2013.01);
(Continued)

(58) Field of Classification Search
CPC ......... B60K 6/383; B60K 6/445; F16H 63/34; F16H 63/3043; F16H 2063/305;
(Continued)

(56) References Cited

U.S. PATENT DOCUMENTS

| 6,290,044 | B1 | 9/2001 | Burgman et al. |
| 8,079,453 | B2 | 12/2011 | Kimes |
| 8,196,724 | B2 | 6/2012 | Samie et al. |
| 8,276,725 | B2 | 10/2012 | Swales et al. |
| 8,418,825 | B2 | 4/2013 | Bird |
| 8,491,439 | B2 | 7/2013 | Kimes |
| 2013/0319810 | A1 | 12/2013 | Bird |

(Continued)

FOREIGN PATENT DOCUMENTS

| DE | 102016104268 A1 | 9/2016 |
| DE | 102017104173 A1 | 9/2017 |

*Primary Examiner* — David J Hlavka
(74) *Attorney, Agent, or Firm* — Dickinson Wright PLLC (57) ABSTRACT The subject disclosure relates to a coil module assembly for a bi-directional clutch assembly having at least one active clutch. The coil module assembly includes a housing having an actuator housing portion and a PCB housing portion. An electromagnetic actuator is disposed in the actuator housing portion for effectuating pivotal movement of the active strut from an unlocked position to a locked position in response to an energization of the electromagnetic actuator. An integrated printed circuit board (PCB) is disposed in the PCB housing portion and is in electrical communication with the electromagnetic actuator for selectively energizing the electromagnetic actuator. The housing further includes a thermally decoupled housing portion which is disposed between the actuator housing portion and the PCB housing portion for thermally decoupling, i.e., reducing heat transfer, from the electromagnetic actuator to the PCB during selective energization of the electromagnetic actuator.

19 Claims, 6 Drawing Sheets (51) Int. Cl.
*F16H 63/34* (2006.01)
*B60K 6/445* (2007.10)
*F16D 41/16* (2006.01)
*F16D 43/25* (2006.01)
*H02K 33/10* (2006.01)
*F16D 27/09* (2006.01)
*F16D 41/12* (2006.01)
*F16H 61/14* (2006.01)

(52) U.S. Cl.
CPC ......... *F16H 63/3043* (2013.01); *F16H 63/34* (2013.01); *H02K 33/10* (2013.01); *B60Y 2400/427* (2013.01); *F16D 27/09* (2013.01); *F16D 41/125* (2013.01); *F16H 61/143* (2013.01); *F16H 2063/305* (2013.01); *Y02T 10/6239* (2013.01)

(58) Field of Classification Search
CPC ....... F16H 61/143; H02K 33/10; F16D 43/25; F16D 41/16; F16D 27/09; Y02T 10/6239; B60Y 2400/427
See application file for complete search history.

(56) References Cited

U.S. PATENT DOCUMENTS

| | | | |
|---|---|---|---|
| 2015/0176708 A1* | 6/2015 | Showalter | F16H 63/304 74/335 |
| 2015/0204390 A1* | 7/2015 | Kimes | F16D 27/09 192/84.8 |
| 2016/0281801 A1* | 9/2016 | Magarida | F16D 41/125 |
| 2017/0254375 A1* | 9/2017 | Campton | F16D 23/12 |
| 2018/0015917 A1* | 1/2018 | Itagaki | B60W 20/50 |
| 2018/0045306 A1* | 2/2018 | Eisengruber | F16D 28/00 |

* cited by examiner

COIL MODULE ASSEMBLY WITH THERMALLY DECOUPLED SOLENOID AND CIRCUIT

CROSS REFERENCE TO RELATED APPLICATION

This application claims the benefit of and priority to U.S. Provisional Application Ser. No. 62/366,330 filed Jul. 25, 2016. The disclosure of the above application is incorporated by reference herein as if fully set forth in its entirety herein.

FIELD OF THE INVENTION

The present disclosure is generally related to overrunning coupling devices such as one-way clutches or brakes and, more specifically to selectable one-way coupling (SOWC) devices having an electromagnetic actuator.

BACKGROUND OF THE INVENTION

This section provides background information related to the present disclosure which is not necessarily prior art.

Automatic transmissions provide a plurality of forward and reverse speed or gear ratios by selectively actuating one or more clutches and/or brakes to establish a torque-transmitting drive connection between a transmission input and a transmission output for supplying motive power (i.e., drive torque) from a powertrain to a driveline in a motor vehicle. One type of brake or clutch widely used in automatic transmission is an overrunning coupling device, commonly referred to as a one-way clutch (OWC), which overruns when one of its races (in radial coupling configuration) or one of its drive plates (in axial coupling configurations) rotates in a first (i.e., freewheel) direction relative to the other race or drive plate, and engages or locks in a second (i.e., lockup) direction. Such conventional one-way clutches provide no independent control over their modes of operation, that is to say whether they lockup or freewheel in both directions and are commonly referred to as passive one-way clutches. Thus, basic one-way clutches provide a "locked" mode in one rotary direction and a "freewheel" mode in the opposite direction based on the direction that the drive torque is being applied to the input race or drive plate.

There are however, requirements in modern automatic transmissions where a "controllable" overrunning coupling device, commonly referred to as a selectable one-way clutch (SOWC), can be selectively controlled to provide additional functional modes of operation. Specifically, a selectable one-way clutch may further be capable of providing a freewheel mode in both rotary directions until a command signal (i.e., from the transmission controller) causes a power-operated actuator to shift the coupling device into its lockup mode. Thus, a selectable one-way clutch may be capable of providing a drive connection between an input member and an output member in one or both rotational directions and it may also be operable to freewheel in one or both directions.

As noted, selectable one-way clutches are equipped with a power-operated actuator for controlling actuation of the coupling device. In some instances, the selectable one-way clutch utilizes a hydraulic actuator to selectively actuate the overrunning coupling device and shift between the available operating modes. Examples of conventional selectable one-way clutches that are hydraulically-actuated are disclosed in U.S. Pat. Nos. 6,290,044, 8,079,453 and 8,491,439. In contrast, it is also known to use an electromechanical actuator with the selectable one-way clutch, one example of which is disclosed in U.S. Pat. No. 8,196,724.

As a further alternative, much development has recently been directed to electromagnetic actuators for use with selectable one-way clutches, examples of which are disclosed in U.S. Pat. Nos. 8,276,725 and 8,418,825 and U.S. Publication No. 2013/0319810. In most electromagnetic actuators, a rocker-type locking element, commonly referred to as a strut, is pivoted from a first position to a second position in response to energization of a coil assembly. In some conventional selectable one-way clutches equipped with an electromagnetic actuator, a "direct-acting" configuration is used such that the strut is part of the magnetic circuit and its pivotal movement is caused by an attraction force applied directly to the strut via energization of the coil assembly. Therefore, precise control of the air gap established between the core/pole piece of the coil assembly and the strut is required to provide robust and reliable lockup functionality. In other conventional selectable one-way clutches equipped with an electromagnetic actuator, an "indirect-acting" configuration is used having a magnetic armature moved in response to the attraction force applied thereto via energization of the coil assembly which, in turn, controls pivotal movement of a non-magnetic strut.

It is typical to enclose the electronics (i.e., printed circuit board (PCB), terminals, etc.) in a separate module located remotely from the electromagnetic actuator, primarily to thermally isolate the electronics from the common operating temperatures (i.e., about 200° C.) associated with the coil assembly of the electromagnetic actuator. However, this requirement increases the complexity of packaging and cost of the selectable one-way clutch and limits the use of stand-alone or modular electromagnetic actuator assemblies.

While all of the different types of selectable one-way clutches mentioned above meet all functional requirements, a need exists to develop alternative arrangements providing improved modularity and thermal management.

SUMMARY OF THE INVENTION

This section provides a general summary of the disclosure and is not intended to be interpreted as a complete and comprehensive listing of all of its aspects, features, configurations, and/or advantages.

It is an aspect of the present disclosure to provide an electromagnetic actuator module for use in a selectable one-way clutch and having an active strut assembly and a coil module assembly.

It is another aspect of the present disclosure to provide a selectable one-way clutch comprised of a clutch module and at least one electromagnetic actuator module. The clutch module includes first and second clutch members aligned for relative rotation. The electromagnetic actuator module is mounted to the first clutch member and includes an active strut assembly and a coil module assembly. The active strut assembly includes a strut moveable between a released position and a locked position relative to locking teeth formed on the second clutch member. The coil module assembly includes a housing defining a coil housing portion and an electronics housing portion that are offset by a thermally decoupled housing portion, a coil unit disposed in the coil housing portion, and a printed circuit board (PCB) disposed in the electronics housing portion. The thermally decoupled portion of the housing provides a thermal management function by providing a flow path for a thermal transfer media (i.e., air or fluid) to pass through and to thermally isolate the PCB from the heat generated upon energization of the coil unit.

A selectable one-way clutch assembly includes a clutch module having an outer race and an inner race presenting a plurality of outer ratchet teeth. The selectable one-way clutch assembly also includes at least one electromagnetic actuator module having an active strut assembly having a strut pivotably supported by the outer race, and a coil module assembly attached to the outer race. The coil module assembly is selectively energized for effectuating pivotal movement of the strut from an unlocked position wherein the strut is disengaged from the outer ratchet teeth to a locked position for engaging one of the plurality of outer ratchet teeth during rotation of the inner race.

The coil module assembly includes a coil unit and an integrated printed circuit board (PCB) which is electrically connected to the coil unit for controlling the selective actuation of the electromagnetic actuator module. The integration of the PCB and the coil unit into a common housing associated with the coil module assembly creates a single unit that ultimately minimizes the number of welded connections between parts during final assembling. Additionally, integration of the PCB into the coil module assembly disposes the electronic controls near the coil unit which leads to improved packaging and reduced wiring for the clutch assembly.

The common housing of the coil module assembly includes a thermally decoupled housing portion which thermally decouples the PCB from any heat generated by the coil unit during operation. Electromagnetic actuators typically reach temperatures of 200° C. when energized, and thus prior clutch assemblies require any electronics to be situated in a separate module that is disposed far away from the heating effects generated by the electromagnetic actuator. However, the integration of the thermally decoupled housing portion into the coil module assembly mitigates any such heating effect of the coil unit on the PCB, allowing these components to be incorporated into the same, single unit. Accordingly, the thermally decoupled portion of the coil module assembly also facilitates a reduction in the bill of material (BOM) items for the clutch assembly.

Further areas of applicability of the present disclosure will become apparent from the detailed description, drawings and specific examples provided hereinafter. It should be understood that the detailed description, drawings and specific examples, while indicating preferred embodiments of the present disclosure, are intended for purposes of illustration only and are not intended to limit the scope of the invention.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein.

DESCRIPTION OF THE ENABLING EMBODIMENTS

Example embodiments will now be described more fully with reference to the accompanying drawings. In general, each embodiment is directed to an electromagnetically-actuated overrunning coupling device (i.e. brake and/or clutch), hereinafter referred to as a selectable one-way clutch (SOWC) assembly, comprised of a clutch module and an electromagnetic actuator module. Thus, the electromechanical rocker clutch transmits torque mechanically but is actuated via an electrical actuation system. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The present disclosure is generally related to electromechanical rocker clutches that function to transmit torque mechanically but which are actuated via electrical actuation/controls. When a voltage and/or current is applied to a coil assembly of the electromagnetic actuator module, the coil assembly becomes an electromagnet and produces a magnetic field. The magnetic flux flows around a magnetic circuit established between the components and is transferred across a small air gap between a moveable rocker-type locking member, commonly referred to as a strut, and a core/pole unit associated with the coil assembly. Magnetization of the core/pole unit functions to magnetically attract the strut for moving the strut from a first or "released" position toward a second or "locked" position. The strut is normally biased toward its released position by a biasing spring. In accordance with alternative arrangements, the magnetic flux flows around the magnetic circuit and is transferred across a small air gap established between a moveable armature and a core/pole unit associated with the coil assembly. Magnetization of the core/pole unit functions to magnetically attract the armature for moving the armature from a first or "non-actuated" position toward a second or "actuated" position. The resulting movement of the armature from its first position to its second position causes corresponding movement of the strut to move from its "released" position toward its "locked" position based on a mechanical connection established between the strut and the armature. The coil assembly, the armature, and the strut define components of the electromagnetic actuator module that is mounted to a first member of a clutch module which together define a selectable one-way clutch assembly.

Movement of the strut to its locked position causes a locking segment of the strut to engage one of a plurality of locking teeth associated with a second member of the clutch module, thereby coupling the first member to the second member for rotation together or against rotation in a certain rotational direction. Disengagement occurs as the voltage and/or current is removed from the coil assembly such that the strut (or the armature) is demagnetized and freed from attraction toward the core of the coil assembly. As such, the biasing member is permitted to forcibly urge the strut to pivot from its locked position back to its released position which, in turn, causes the armature to move from its actuated position to its non-actuated position.

In accordance with the present invention there is provided a clutch assembly of the type, for example, for use in an automatic transmission (not shown) which is controlled using an on-off relay to actuate a clutch mechanism. The clutch assembly is disclosed to be a controllable overrunning coupling device, commonly referred to as a selectable one-way clutch (SOWC) assembly. For the purpose of this application, the term "clutch assembly" should be interpreted to include couplings, clutches and brakes wherein one component is driveably connected to a torque delivery component of the transmission while the other component is driveably connected to another torque delivery component or is non-rotatably fixed to a transmission housing or stationary component. As such, the terms "coupling", "clutch" and "brake" may be used interchangeably.

Figure 2:
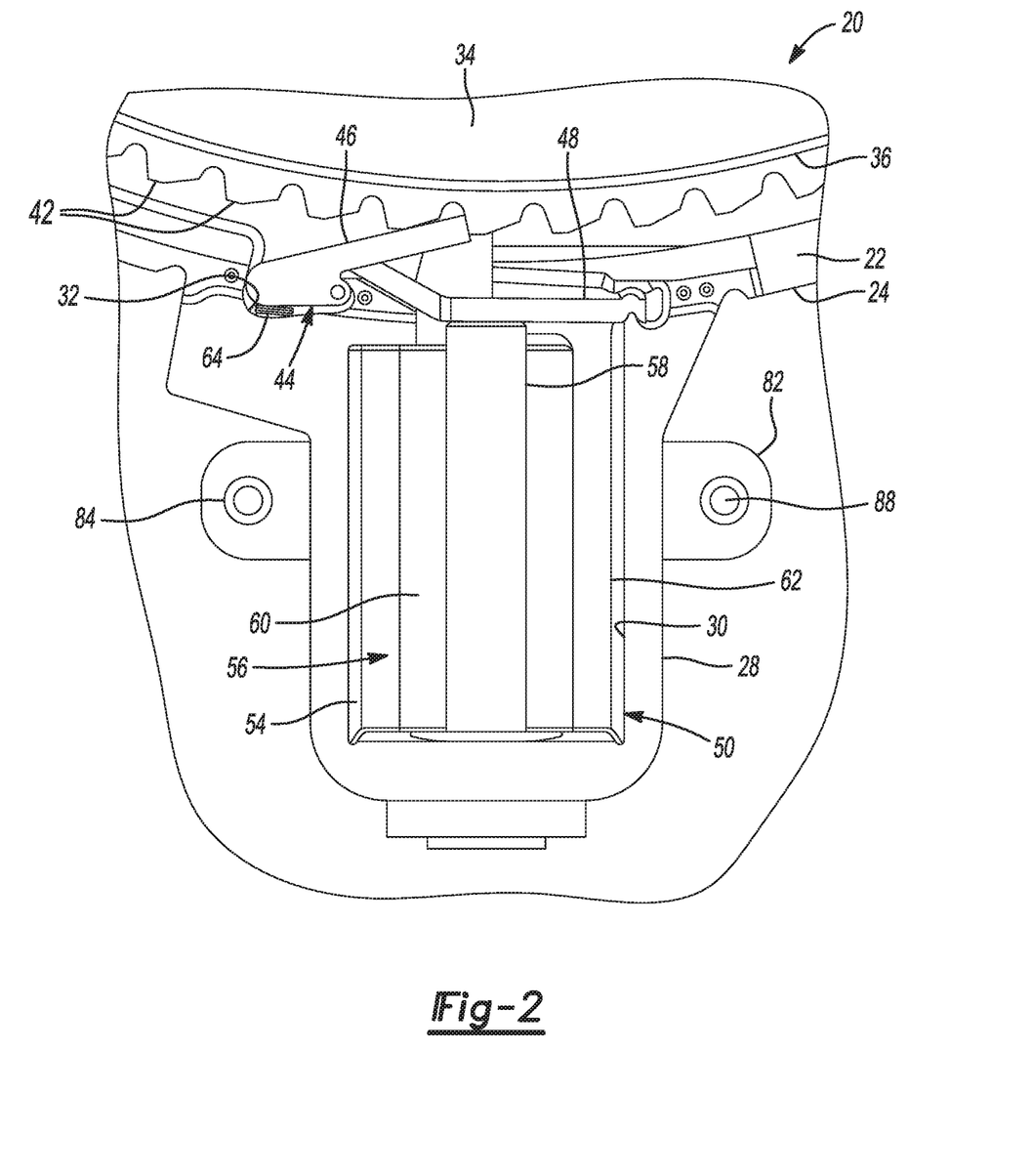
FIG. 2 is a partial sectional view of the selectable one-way clutch assembly operating in an engaged state.
Figure 3:
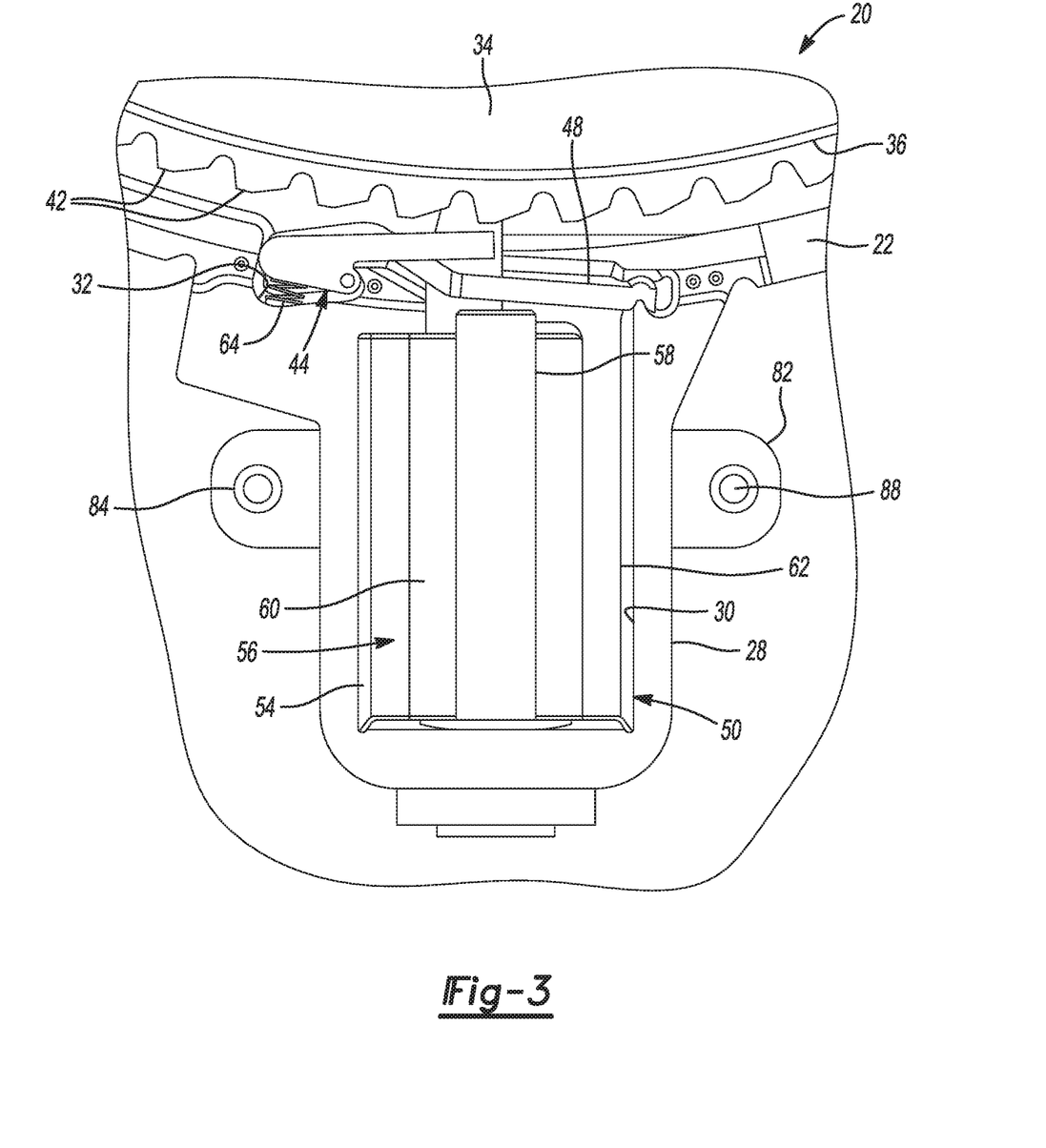
FIG. 3 is another partial sectional view of the selectable one-way clutch assembly operating in a disengaged state.

Referring to the drawings, wherein like reference numbers indicate corresponding components, assemblies and modules throughout the several views, a selectable one-way clutch (SOWC) assembly 10 is generally shown to include a clutch module 20 and an electromagnetic actuator module 18. Clutch module 20 includes a first clutch member or outer race 22 and a second clutch member or inner race 34. Outer race 22 includes an outer rim segment 24 having a plurality of radially extending outer lugs 26 configured to mate with a first component. The first component can be a stationary component (i.e., a transmission housing) or a rotary component (i.e., a shaft). Outer rim segment 24 further includes at least one radially-extending protrusion 28 configured to define an actuator pocket 30 and a strut pocket 32, as best shown in FIGS. 2 and 3. Inner race 24 includes an outer rim segment 36 having a plurality of ramp-shaped projections, referred to as ratchet teeth 42. An inner diameter surface 38 of inner race 34 includes a plurality of inner lugs 40 configured to mate with a second component (i.e., a rotary component). For example, inner lugs 40 interconnect inner race 34 for common rotation with a shaft or clutch plates.

Referring primary to FIGS. 2 and 3, electromagnetic actuator module 18 is shown to generally include a coil module assembly 50 disposed within actuator pocket 30 of protrusion 28 on outer race 22, and an active strut assembly 44 disposed within strut pocket 32 of protrusion 28 on outer race 22. Strut assembly 44 includes a strut 46, an armature 48, and a strut biasing spring 64. Armature 48 is pivotally moveable between a first or non-actuated position (FIG. 3) and a second or actuated position (FIG. 2). Armature 48 is mechanically connected to strut 46 such that movement of the armature 48 between its non-actuated and actuated positions results in concurrent movement of strut 46 between a first or disengaged position (FIG. 3) and a second or engaged position (FIG. 2). Strut biasing spring 64 functions to normally bias to its disengaged position. In the engaged position, strut 46 lockingly engages one of ratchet teeth 42 on inner race 34 to prevent relative rotation of inner race 34 relative to outer race 22 in a first (i.e., clockwise) direction so as to define a locked state for clutch assembly 10. However, strut 46 still allows relative rotation (i.e., overrun) in a second (i.e., counterclockwise) direction as it ratchets over ratchet teeth 42 so as to define a freewheeling or unlocked state for clutch assembly 10.

As best shown in FIGS. 2 and 3, coil module assembly 50 includes a housing 52 having an actuator housing portion 54 that is disposed within actuator pocket 30 when coil module assembly 50 is attached to outer race 22. Coil module assembly 50 includes coil unit 56 that is disposed within and surrounded (i.e., encapsulated) by actuator housing portion 54. In a preferred arrangement, actuator housing portion 54 is overmolded with coil unit 56. However, other methods of integrating coil unit 56 within actuator housing portion 54 can be utilized without departing from the scope of the subject disclosure. When actuator housing portion 54 is disposed within the radially extending actuator pocket 30, coil unit 56 is radially spaced from armature 48 of active strut assembly 44. Coil unit 56 includes a pole piece or core 58 made of a magnetically permeable material, a non-magnetic bobbin 60 disposed about core 58, and a coil or solenoid 62 wrapped about bobbin 60. Armature 48 is disposed between strut 46 and coil 62 for pivoting toward core 58 and thus providing the pivotal movement of the strut 46 in response to energization of coil 62.

More specifically, when voltage and/or current are applied to coil 62, coil 62 becomes an electromagnet producing an electric field (or flux). The flux flows outwards in all directions and transfers through the small air gap between armature 48 and core 58 in the center of coil unit 56. Core 58 becomes magnetized, therefore attracting armature 48 towards core 58. The resulting motion forces active strut 46 to mechanically deploy due to the linkage between active strut 46 and armature 48. On deployment, active strut 46 moves from its disengaged position to its engaged position where it locates itself against one of outer ratchet teeth 42 of inner race 34, effectively locking inner race 34 from rotating relative to outer race 22. Disengagement occurs as voltage and/or current is removed from coil unit 56, wherein armature 48 is demagnetized and free from the attraction force of coil unit 56. Biasing spring 64 is positioned between active strut 46 and outer race 22 for causing active strut 46 to move back to its disengaged position during disengagement.

It should be appreciated that the arrangement of armature 48, active strut 46, and coil unit 56 can act to apply a locking force in a radial direction (as shown in FIGS. 2 and 3) or an axial direction, depending on the layout and/or requirements of clutch assembly 10. Radial stacked clutch assembly designs offer packaging advantages over their axial counterparts in situations where axial space is tight, e.g., in automatic transmissions. Further, radially applied clutches transmit driving torque directly outwards to be grounded against the transmission housing without the fear of forces being directed axially which could cause problems for the sizing of other system components to compensate for axial force.

Figures 4, 5:
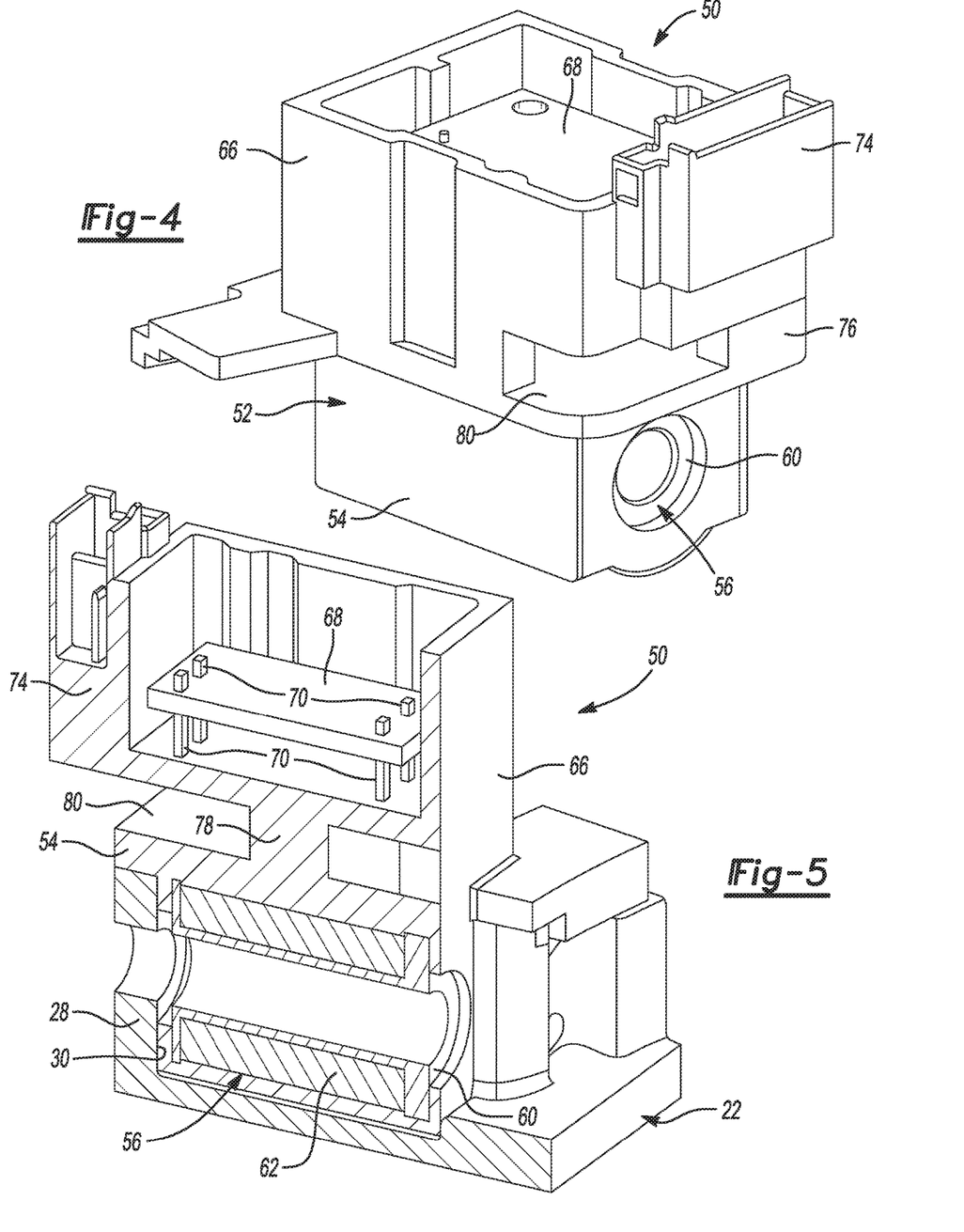
FIG. 4 is a isometric view of a coil module assembly associated with the electromagnetic actuator module illustrating integration of a printed circuit board (PCB) and coil unit into a common housing.
FIG. 5 is a sectional isomeric view of the coil module assembly illustrating a thermally decoupled housing portion disposed between an actuator housing portion and a PCB housing portion and further illustrating an electrical connection between the PCB and the coil unit.
Figure 6:
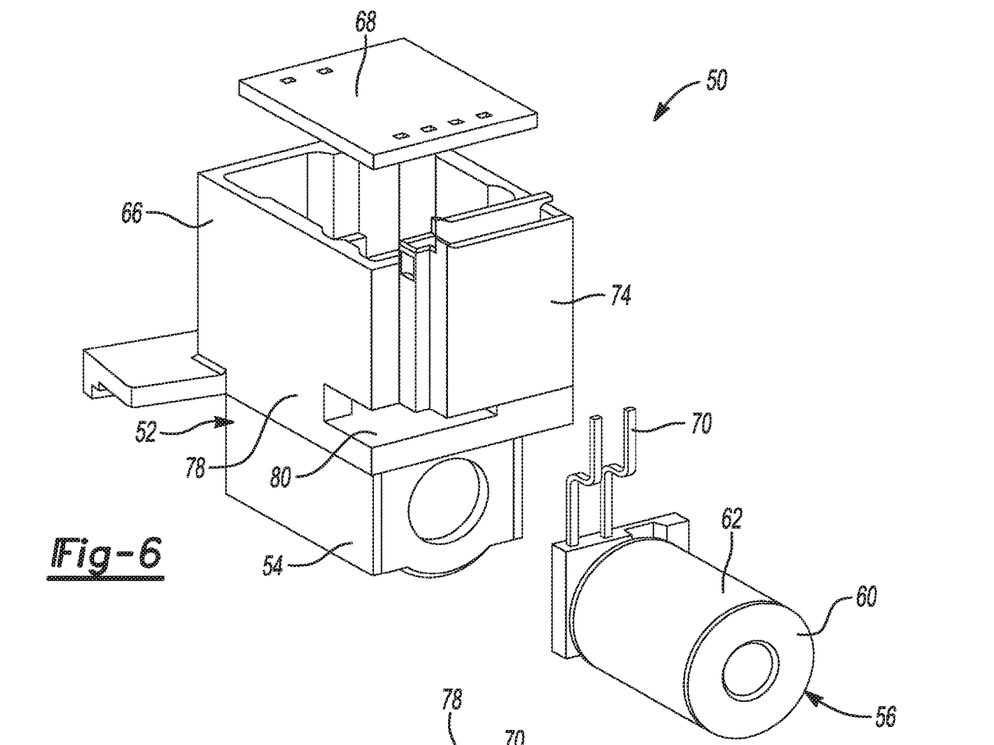
FIG. 6 is an exploded isometric view of the coil module assembly.
Figure 7:
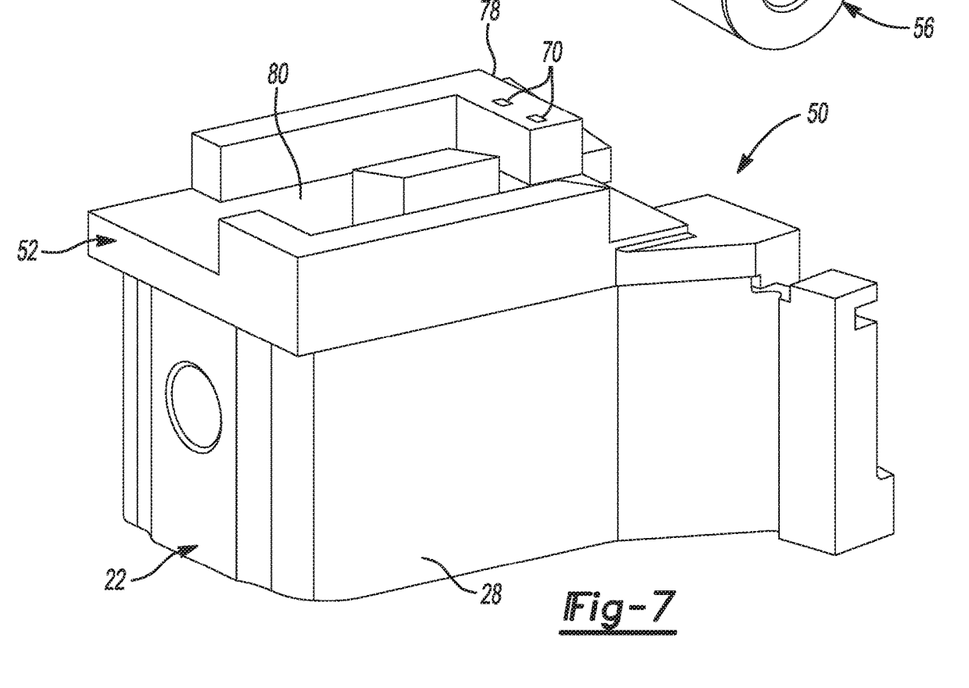
FIG. 7 is a sectional perspective view of the coil module assembly illustrating the electrical connection extending through the thermally decoupled housing portion and which defines at least one channel for use in cooling the PCB during energization of the coil unit.

As best shown in FIGS. 4-6, housing 52 of coil module assembly 50 also includes a PCB housing portion 66 disposed in spaced but interconnected relationship to actuator housing portion 54. Coil module assembly 50 also includes an integrated printed circuit board (PCB) 68 which is disposed within PCB housing portion 66 and is electrically connected with the coil unit 56. Printed circuit board (PCB) 68 selectively controls the energization of coil unit 56, and specifically coil or solenoid 62. In that regard, and as best illustrated in FIGS. 5-7, coil module assembly 50 includes at least one power contact 70, such as a wire, pin connector, or the like, that extends between printed circuit board 68 and coil unit 56. The at least one power contact 70 is disposed in electrical contact with coil 62 to provide power to coil 62 and to establish the electrical connection between PCB 68 and coil unit 56. In a preferred arrangement, a resistance welded connection is utilized to connect the at least one power contact 70 and coil 62, however, other connections could alternatively be utilized without departing from the scope of the subject disclosure. The selective energization of coil 62 by way of the integrated printed circuit board 68 effectuates pivotable movement of active clutch 46 from the disengaged to the engaged position for engaging one of the plurality of outer ratchet teeth 42 during rotation of inner race 34.

Figure 9:
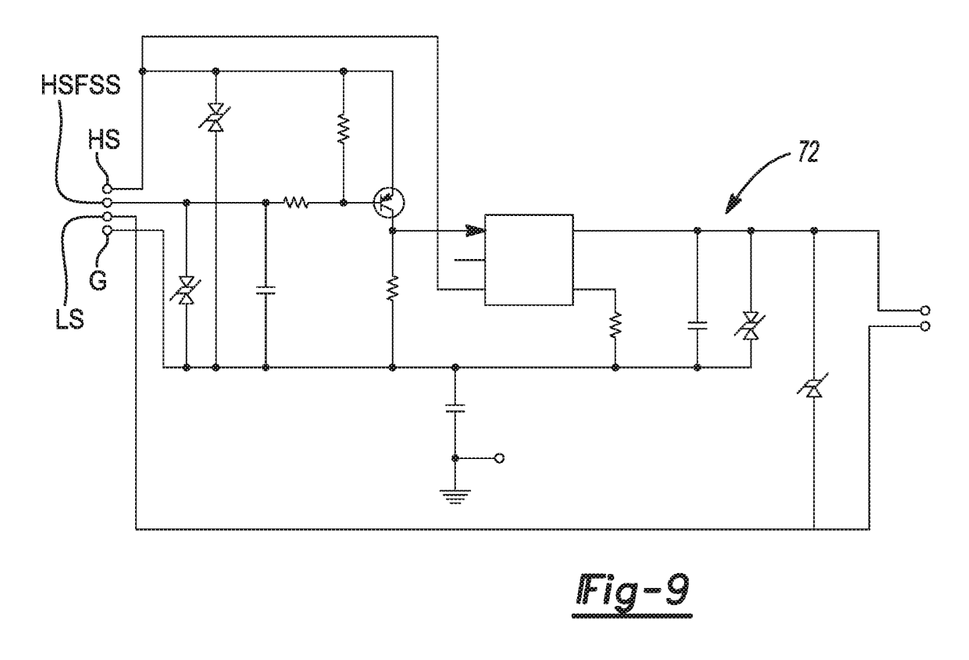
FIG. 9 is an exemplary circuit of the printed circuit board (PCB) integrated into the coil module assembly.

FIG. 9 illustrates an exemplary embodiment of a circuit 72 that could be utilized with printed circuit board 68 according to an aspect of the disclosure. With reference to FIG. 9, the voltage applied to coil 62 via the exiting terminals of the circuit 72 is comprised of a High Side HS and Low Side LS which, in a non-limiting example, is supplied by the TCM or the PCM of a vehicle. The High Side HS is typically a shared power supply with other loads, and the Low Side LS is typically a discrete channel that controls the discrete/individual circuit. The Low Side LS is capable of controlling the amount of current across coils 62. Circuit 72 also includes a power ground G. A High Side Fail Safe Switch HSFSS is incorporated into circuit 72 of printed circuit board 68, and thus integrated into coil module assembly 50, to add another level of logic in order to control the shared High Side HS supply. The High Side Fail Safe Switch HSFSS is comprised of a High Side Switch, a transistor, and passive components each electrically integrated into coil module assembly 50. Thus, it should be appreciated that the configuration of coil module assembly 50 which integrates PCB 68 protects the integrated electronic components (including the HSFSS) and provides improved packaging and reduced wiring to clutch assembly 10. Additionally, the direct connection of circuit 72 (including the HSFSS) to coil unit 56, each of which are integrated within coil module assembly 50, provides a single, piece unit that reduces the bill of material (BOM) items for clutch assembly 10. In other words, coil module assembly 50 advantageously integrates PCB 68 and coil unit 56 within housing 52 to reduce assembly components.

Figure 1:
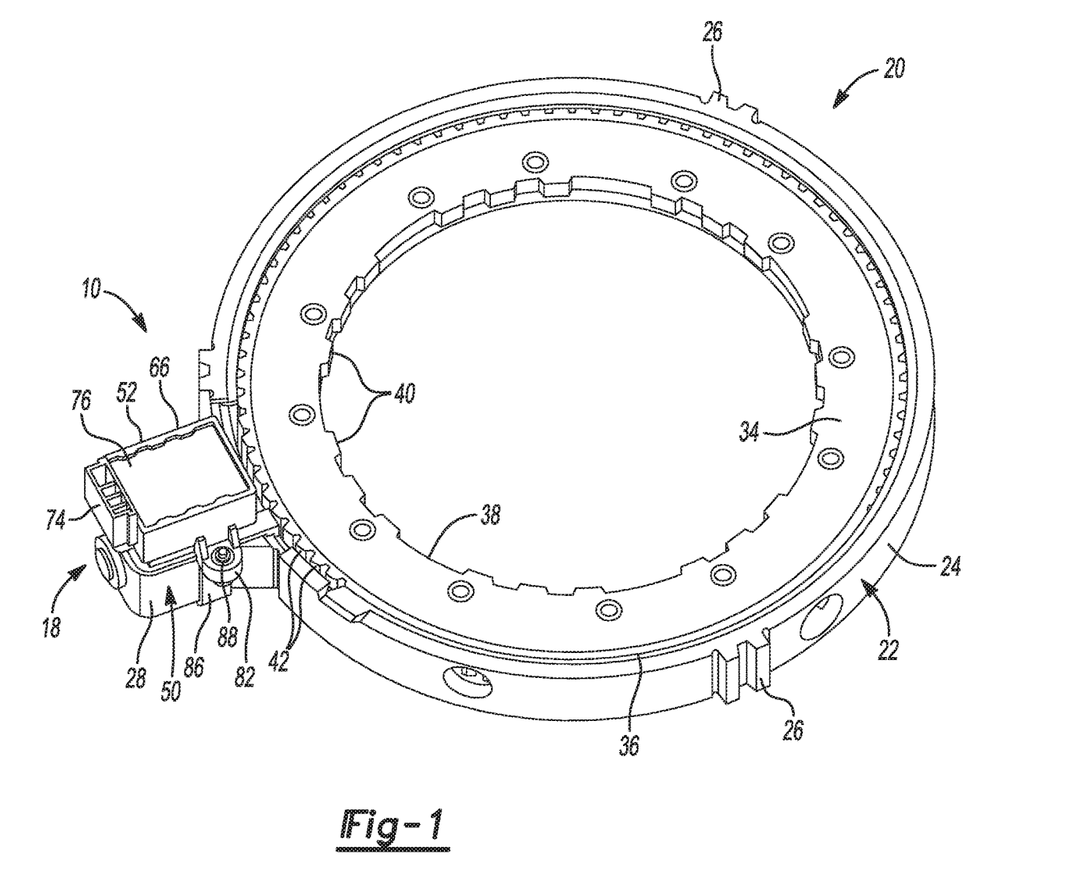
FIG. 1 is an isometric view of a selectable one-way clutch assembly configured to include a clutch module and an electromagnetic actuator module constructed in accordance with the teachings of the present disclosure.

As best illustrated in FIG. 5, PCB housing portion 66 includes a connection interface 74 for establishing an electrical connection between printed circuit board 68 and an external control module (not expressly shown), such as a transmission control module (TCM) or a powertrain control module (PCM) for allowing data and power to be transmitted to printed circuit board 68. Connection interface 74 facilitates a modular design for clutch assembly 10 by allowing a wire harness to be directly connected to coil module assembly 50, and thus reducing the requirements for external electronic elements. As best illustrated in FIG. 1, coil module assembly 50 includes a casing 76, such as an epoxy sealer, or the like, which encapsulates printed circuit board 68 within housing 52 to protect printed circuit board 68 and its associated electrical wiring from an operating environment of clutch assembly 10. As an example, casing 76 allows coil module assembly 50, and its integrated PCB 68, to be submerged in automatic transmission fluid (ATF).

During energizing of coil unit 56, coil 58 can reach temperatures of up to 200° C. which can compromise the integrity of PCB's which can typically only be exposed to temperatures of approximately 140° C. Thus, prior clutch assemblies necessarily required the electronics/PCB to be situated in a module separate from the clutch assembly, and far away from the heating effects generated by coil unit 56. In the subject design, housing 52 of coil module assembly 50 includes a thermally decoupled housing portion 78 disposed between actuator housing portion 54 and PCB housing portion 66 to thermally decouple or mitigate the heating effects of coil 62 on PCB 68 and allow PCB 68 and coil 62 to each be integrated into coil module assembly 50. As best illustrated in FIGS. 4-8, the thermal decoupled housing portion 78 defines at least one channel 80 extending therethrough for cooling PCB 68 during operation of coil unit 56, such as by allowing automatic transmission fluid (ATF) to flow through channel 80. Accordingly, even though coil unit 56 may heat up to 200° C. during operation, PCB 68 does not reach these same temperatures. Instead, the at least one channel 80 which extends through thermally decoupled housing portion 78 limits heat transfer from coil 62 to PCB 68, and thus thermally decouples these components from one another.

Figure 8:
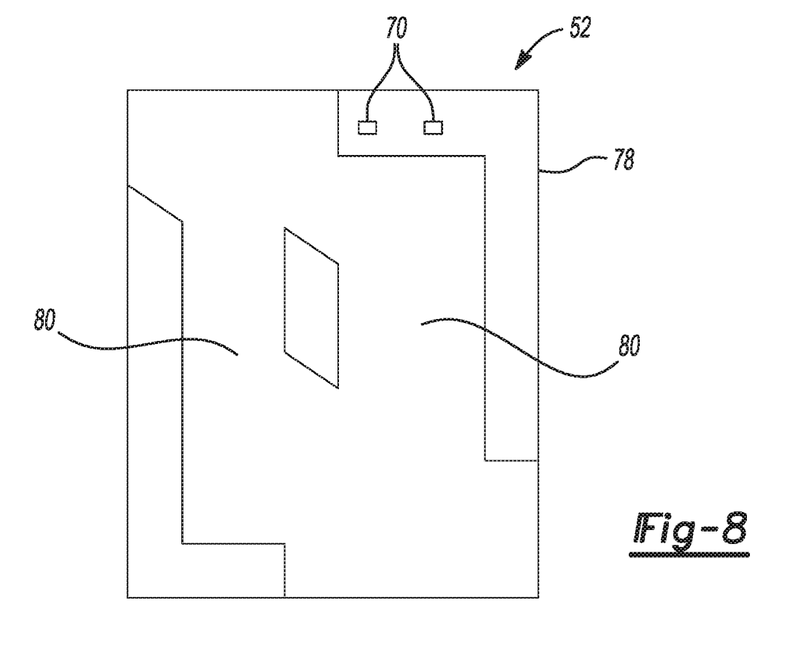
FIG. 8 is a sectional top view of the thermally decoupled housing portion of the common housing.

As best illustrated in FIGS. 5 and 7-8, the at least one power contact 70 extends through thermally decoupled housing portion 78 to establish the electrical connection between PCB 68 and coil unit 56. Accordingly, the at least one power contact 70 is protected within housing 52 and isolated from an environment of clutch assembly 10, such as the automatic transmission fluid (ATF) in which clutch assembly 10 may be submerged.

As best illustrated in FIGS. 1-3, housing 52 of coil module assembly 50 also includes a pair of mounting ears 82, each of which extend outwardly from PCB housing portion 66 and a pair of threaded inserts 84 secured in respective mounting ears 82. Mounting ears 82 and threaded inserts 84 allow coil module assembly 50 to be connected to outer race 22 to establish the interconnection of coil module assembly 50 to clutch module 20. For example, as best illustrated in FIG. 1, a clip 86 can be disposed in surrounding relationship with protrusion 28 and a fastener 88, such as a bolt, screw, or the like, can pass through clip 86 and mate with threaded insert 84 to secure coil module assembly 50 to clutch module 20. However, other ways of interconnecting coil module assembly 50 to clutch module 20 can be utilized without departing from the scope of the subject disclosure.

A method of manufacturing coil module assembly 50 begins by placing coil unit 56 in a mold and then overmolding coil unit 56 to form actuator housing portion 54 which surrounds coil unit 56, thermally decoupled housing portion 78, and PCB housing portion 66 which includes mounting ears 82. The PCB 68 is then soldered to at least one power contact 70 extending from the coil unit 56 and through the thermally decoupled housing portion 78. The manufacturing method concludes by covering PCB 68 with a casing 76, such as an epoxy resin, to seal PCB 68 from an environment of the clutch assembly 10.

The present disclosure is directed to providing a standalone coil module assembly 50 having a common housing 52 configured to encapsulate coil unit 56, provide a mounting location for PCB 68 with direct electrical connection to coil unit 56, and thermally isolate PCB 68 from coil unit 56 in a manner providing a flow path therebetween used to transfer heat from coil unit 56 to the surroundings. Once active strut assembly 44 is assembled into clutch module 10, coil module assembly 50 can be assembled to enclose strut assembly 44 and secure electromagnetic actuator module 18 to clutch module 20.

It should be appreciated that the foregoing description of the embodiments has been provided for purposes of illustration and the modular configuration of the coil module assembly and associate components could be utilized on other clutch assembly configurations, e.g., axially engaging clutch assemblies. In other words, the subject disclosure it is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed:

1. A selectable one-way clutch assembly, comprising:
   a clutch module including a first clutch member and a second clutch member having a plurality of ratchet teeth, wherein at least one of said first and second clutch members is adapted to rotate relative to the other of said first and second clutch members; and
   an electromagnetic actuator module mounted to said first clutch member and having an active strut assembly and a coil module assembly, said active strut assembly including an active strut pivotable between a first position released from engagement with said ratchet teeth and a second position engaged with one of said ratchet teeth, and a biasing member normally biasing said active strut towards its first position, said coil module assembly including an actuator housing having a first housing portion enclosing a coil unit, a second housing portion enclosing a printed circuit board, and a third housing portion thermally decoupling said printed circuit board from said coil unit.

2. The selectable one-way clutch assembly of claim 1, wherein energization of said coil unit causes said active strut to move from its first position to its second position.

3. The selectable one-way clutch assembly of claim 1, wherein said coil unit is electrically connected directly to said printed circuit board via electrical contacts extending through said third housing portion of said actuator housing.

4. The selectable one-way clutch assembly of claim 1, wherein said third housing portion of said actuator housing defines at least one flow channel to permit a heat transfer medium to cool said printed circuit board during energization of said coil unit.

5. The selectable one-way clutch assembly of claim 4, wherein said medium is transmission oil.

6. The selectable one-way clutch assembly of claim 4, wherein said electromagnetic actuator module further includes at least one power contact extending through said third housing portion to establish an electrical connection between said printed circuit board and said coil unit.

7. The selectable one-way clutch assembly of claim 1, wherein said actuator housing includes a fourth housing portion defining an integrated connection interface for establishing an electrical connection to an external control module for supplying data and power to said printed circuit board.

8. The selectable one-way clutch assembly of claim 1, wherein said first clutch member provides a protrusion defining an actuator pocket configured to support said coil module assembly therein.

9. The selectable one-way clutch assembly of claim 8, wherein said actuator housing defines mounting lugs for mounting said coil module assembly to said protrusion.

10. The selectable one-way clutch assembly of claim 9, wherein a clip surrounds the protrusion and fasteners extending through the mounting lugs secure the coil module assembly to the protrusion on the first clutch member.

11. The selectable one-way clutch assembly of claim 1, wherein said coil module assembly further includes a casing enclosing said printed circuit board within said second portion of said actuator housing.

12. The selectable one-way clutch assembly of claim 1, wherein said actuator housing is a one-piece housing configured to encapsulate said coil unit.

13. A coil module assembly for a bi-directional clutch assembly having a clutch module and a strut, said coil module assembly comprising:
    a housing having an actuator housing portion and a printed circuit board (PCB) housing portion;
    a coil unit disposed in said actuator housing portion for effectuating pivotal movement of said strut in response to an energization of said coil unit; and
    an integrated printed circuit board (PCB) disposed in said PCB housing portion and in electrical communication with said coil unit for selectively energizing said electromagnetic actuator.

14. The coil module assembly of claim 13, wherein said housing further includes a thermally decoupled housing portion disposed between said actuator housing portion and said PCB housing portion for thermally decoupling said PCB from said coil unit during said energization thereof.

15. The coil module assembly of claim 14, wherein said thermally decoupled housing portion defines at least one channel to cool said PCB during said energization of said coil unit and establish said thermal decoupling therebetween.

16. The coil module assembly of claim 14 further comprising at least one power contact extending from said PCB, through said thermally decoupled housing portion, directly to said coil unit to establish said electrical connection between said PCB and said coil unit.

17. The coil module assembly of claim 13, wherein said housing further comprising an integrated connection interface to establish an electrical connection to an external control module for receiving data and power at said PCB.

18. The coil module assembly of claim 14 further comprising a casing to encapsulate said PCB within said PCB housing portion.

19. The clutch assembly of claim 18, wherein said casing comprises an epoxy sealer.

* * * * *